May 5, 1959 J. L. METZ 2,885,486

RECORD PLAYING APPARATUS

Filed March 29, 1957

Inventor
Jack L. Metz
By Schroeder, Hofgren, Brady & Wegner
Attorneys 2,885,486

RECORD PLAYING APPARATUS

Jack L. Metz, Chicago, Ill., assignor to Warwick Manufacturing Corporation, a corporation of Delaware Application March 29, 1957, Serial No. 649,483

6 Claims. (Cl. 179—100.1)

Figure 1:
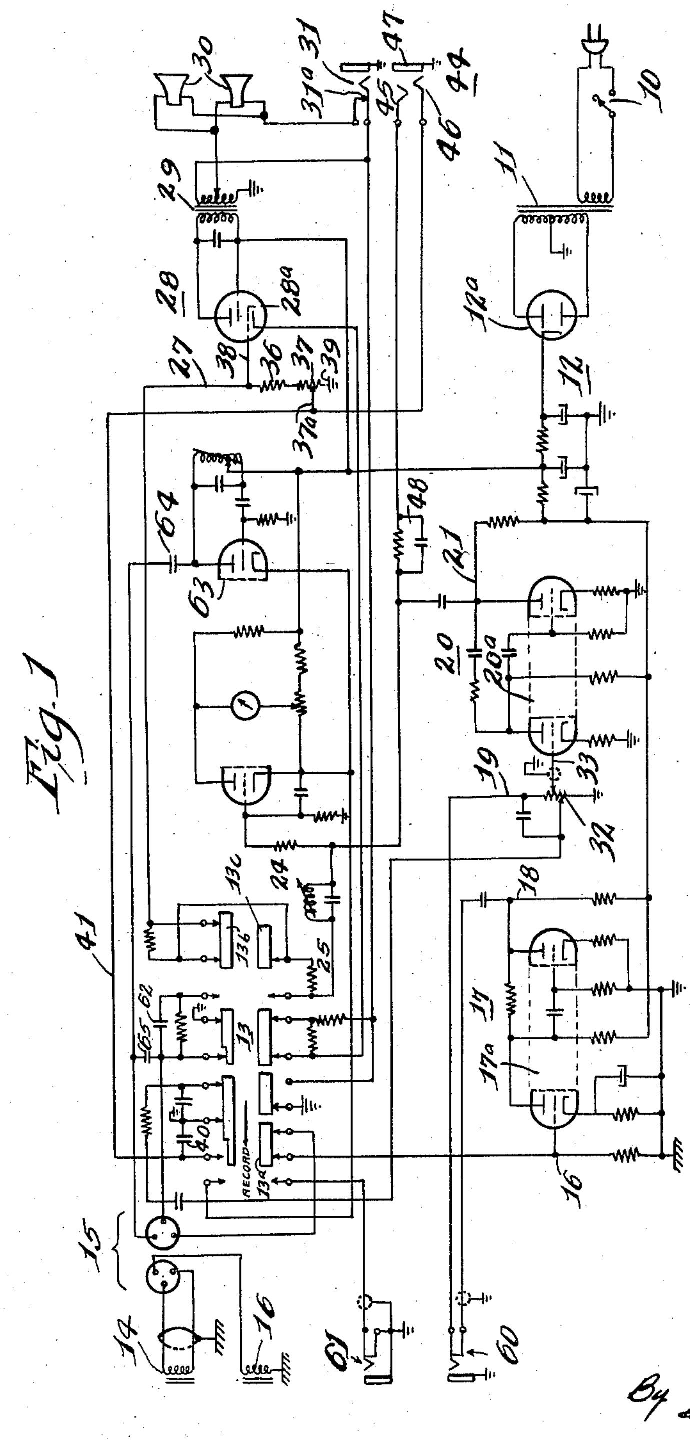

This invention is concerned with a record playing apparatus and more particularly with a record playing apparatus having both an internal reproducing system and provision for attaching an external amplifier.

Many record players which are designed for use with an external amplifying arrangement, as a public address system or a high fidelity amplifier, are also provided with an internal amplifier and reproducer which may be used as a monitor or by itself as the sole output of the record player. It is, of course, desirable to have a control which effects only the volume of the internal or monitor amplifier.

The general object of this invention is to provide a novel circuit incorporating a volume control for the internal amplifier of a reproducer and which is rendered operative when an external amplifier is connected to the record player.

Another object is to provide in a record playing apparatus an internal monitor amplifier having an input and an output, a source of signal connected with the input of the monitor amplifier, a variable impedance element operably associated with the monitor amplifier, a reactive element operably connected with the variable impedance element so that the impedance element serves as a tone control for the monitor amplifier, and means for coupling an external amplifier to the source of signal, the coupling means including means for connecting the variable impedance to operate as a volume control for the internal amplifier when the external amplifier is coupled to the source of signal. A further object is to provide coupling arrangement for an external amplifier including a plug and jack, and switch means connected with the impedance and reactance elements and associated with the plug and jack to be actuated by the insertion of the plug in the jack to connect the impedance element as a volume control for the monitor amplifier.

A further object is the provision of a combination recording and playback apparatus including an internal monitor amplifier having a control element and an output element, internal speaker means connected to the output element of a monitor amplifier, voltage amplifying means having an output, means including a variable impedance element connecting the output of the voltage amplifier and the input of the monitor amplifier, switch means having a first position connecting the apparatus for recording and a second position connecting the apparatus for playback, a reactive element connected with the variable impedance element through the switch means when in the playback position, providing a tone control for the internal amplifier, means for coupling an external amplifier to the output of the voltage amplifier, the coupling means including means connecting the variable impedance for operation as an internal monitor amplifier volume control when an external amplifier is coupled to the output of a voltage amplifier.

Figure 2:
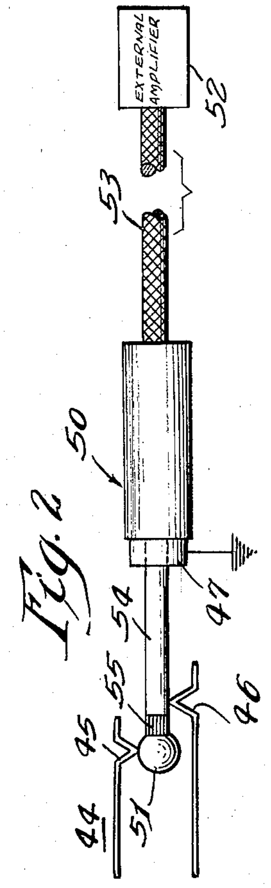

The objects of the invention generally set forth, together with other ancillary advantages, are attained by the construction and arrangement shown by way of illustration in the accompanying drawings, in which:

Figure 1 is a schematic drawing of a recording and playback apparatus embodying the invention; and Figure 2 is a diagrammatic view of a plug and jack used in the circuit of Figure 1.

While this invention is susceptible of embodiment in many different forms, there is shown in the drawings and will herein be described in detail an illustrative embodiment of the invention with the understanding that the present disclosure is to be considered as an exemplification of the principles of the invention and is not intended to limit the invention to the embodiment illustrated. The scope of the invention will be pointed out in the appended claims.

Reference will now be made to the circuit of Figure 1 where the invention is embodied in a combination tape recorder and player. The entire system will be described generally so that its operation will be understood, but only those portions of the circuit which are particularly concerned with the present invention will be described in detail. While specific tube types, component values and operating conditions are given for certain of the elements, it will be understood that, unless specified to the contrary, these types, values and conditions are not critical and many modifications will be apparent to those skilled in the art.

The apparatus is energized from a suitable source of power, as 110 volts, 60 cycle A.C. through an on-off switch 10 and a power transformer 11. A power supply 12 including a full wave rectifier 12*a*, which may be a 6X5, provides B+ operating voltages for the apparatus. A two position, multiple-section selector switch 13 converts the apparatus from "Play" to "Record" and is shown in Figure 1 in the "Play" position. It is moved to the left as indicated in the drawing to connect the apparatus for "Record." A signal from magnetic tape (not shown) is picked up by head 14 and coupled through a three prong connector 15 and switch section 13*a* to the input 16 of a first voltage amplifier section 17, which comprises both halves of a dual triode 17*a*, for example a 12AU7. The amplified signal is developed at the output 18 of amplifier section 17 and is coupled to the input 19 of a second section 20 of the voltage amplifier, which may be of another dual triode 20*a*, as a 12AX7. The signal, which is now further amplified, appears at the output 21 of the second section of voltage amplification and is coupled through a filter 24, tuned to the frequency of the internal oscillator, a series resistor 25, 68,000 ohms and section 13*b* of the switch to the input 27 of an internal or monitor power amplifier stage 28 which may include a power amplifier tube 28*a*, as a 6V6. The signal from amplifier 28*a* is developed in an output transformer 29 through which it is coupled to suitable internal speakers 30.

The term "internal speaker" is used to indicate either a speaker which may actually be mounted in the cabinet with the rest of the apparatus or in an associated cabinet. An additional speaker or speakers may be coupled to the power amplifier 28 through a jack 31; and use of the jack 31 opens switch 31*a*, disconnecting speakers 30.

A potentiometer 32 in the input circuit of voltage amplifier section 20 has the control grid 33 of the first section of tube 20*a* connected to the movable tap thereof and provides a volume control for the voltage amplifier section of the apparatus. In the input circuit 27 of the power amplifier 28, a fixed resistor 36, 10,000 ohms and a potentiometer 37, 500,000 ohms are connected in series between the control grid 38 of the power amplifier and ground 39. A capacitor 40 is connected through lead 41 with the movable tap 37*a* of potentiometer 37 and to ground, thus shunting the lower portion of potentiometer 37 and providing a tone control for the monitor amplifier.

If it is desired to use an external amplifier, as a public address system or a high fidelity reproducing system, the input of such system may be connected with the apparatus through a jack 44. The jack 44 has two spring contacts 45 and 46 and a grounded ring 47. The spring contact 45 is connected through a matching impedance 48 with the output 21 of the second section 20 of the voltage amplifier. Spring contact 46 is connected with the movable tap 37*a* of potentiometer 37. The jack is adapted to receive a plug 50, which is shown in Figure 2, and which has a conductive tip portion 51 connected with the conductor of a shielded cable 53 which is connected to the input of the external amplifying apparatus 52. The plug is also provided with a conductive barrel portion 54 separated from the tip 51 by an insulating ring 55.

As shown in Figure 2, the tip 51 engages spring contact 45 which is connected to the output of the voltage amplifier. The jack and plug are so related that the barrel 54 of the plug connects the spring contact 46 with ground ring 47, grounding the tap 37*a* of potentiometer 37 and shorting tone control capacitor 40. With the adjustable tap 37*a* grounded, potentiometer 37 functions as a volume control for power amplifier 28 permitting adjustment of the output volume of the monitor amplifier to suit the operator without varying the volume of the external amplifier, which may of course be controlled by volume control 32 and by other volume controls in the external amplifier.

Thus, if the apparatus is used to feed a public address system in which the speakers are located some distance from the record player, the internal amplifier may be used to monitor the operation, while if the external amplifier is a high fidelity unit located in the same room, the volume of the monitor amplifier may be reduced.

The apparatus may also be used as an ordinary amplifier by applying a desired signal as from a radio or phonograph to the jack 60 which is connected to the input 19 of second section 20 of the voltage amplifier.

The act of inserting an input plug in jack 60 automatically disconnects the output 18 of the first section 17 of the voltage amplifier.

To "Record," selector switch 13 is moved to the left and a desired input signal may be connected to jack 60 if from a radio or phonograph or the like, or to jack 61 if from a microphone. The signal to be recorded is amplified in one or both of the amplifier sections 17 and 20 and coupled from the output 21 of second voltage amplifier section 20 through filter 24, switch section 13*c*, switch section 13*b*, coupling capacitor 62, 470 μμf. and connector 15 to the magnetic head 14. A bias signal is generated in oscillator 63, which may be one-half of a 12AU7, and is coupled through capacitors 64, .001 μf. and 65, 75 μμf. to head 14. Another portion of the bias signal is coupled through capacitor 64 and connector 15 to erase head 66 to clear the magnetic tape before the new signal is recorded.

In any event, when an external amplifier is connected to the apparatus, the insertion of plug 50 in jack 44 automatically grounds the tap 37*a* of potentiometer 37, connecting the potentiometer for operation as a volume control for the internal monitor amplifier 28.

I claim:

1. In a combination recording and playback apparatus: an internal monitor amplifier having a control element and an output element; internal speaker means operably connected to the output element of said monitor amplifier; voltage amplifying means having an output; means, including a variable impedance element connecting the output of the voltage amplifier and the input of the monitor amplifier; switch means having a first position connecting said apparatus for recording and a second position connecting said apparatus for playback; a reactive element connected with said variable impedance element through said switch means when in the playback position, said variable impedance element providing a tone control for said internal amplifier; means for coupling an external amplifier to the output of said voltage amplifier, said coupling means including means connecting said variable impedance element for operation as an internal monitor amplifier volume control when an external amplifier is coupled to the output of the voltage amplifier.

2. In a combination recording and playback apparatus: an internal monitor amplifier having a control element and an output element; internal speaker means operably connected to the output element of said monitor amplifier; voltage amplifying means having an output; means, including a variable impedance element connecting the output of the voltage amplifier and the input of the monitor amplifier; switch means having a first position connecting said apparatus for recording and a second position connecting said apparatus for playback; a reactive element connected with said variable impedance element through said switch means when in the playback position, said variable impedance element providing a tone control for said monitor amplifier; means, including a plug and jack for coupling an external amplifier to the output of said voltage amplifier; and switch means associated with said impedance and reactive elements and actuated by the insertion of the plug in said variable jack to connect said impedance element as a volume control for said monitor amplifier.

3. In a combination recording and playback apparatus: an internal monitor power amplifier having a control element and an output element; internal speaker means operably connected to the output element of said monitor amplifier; voltage amplifying means having an output; means, including a variable impedance element having a movable tap, connecting the output of the voltage amplifier and the input of the monitor amplifier; switch means having a first position connecting said apparatus for recording and a second position connecting said apparatus for playback; a reactive element connected with the movable tap of said variable impedance output through said switch means when in the playback position, said variable impedance element providing a tone control for said monitor amplifier; means for coupling an external amplifier to the output of said voltage amplifier and including a plug having a conductive barrel portion and a jack having a spring contact and a ring, both adapted to engage the barrel of said plug when the plug is inserted in the jack; and connections between said reactive element and said spring contact and ring for shorting the reactive element when the jack is inserted in the plug, whereby said variable impedance element serves as a volume control for said internal monitor amplifier.

4. In a record playing apparatus: an internal monitor amplifier having an input and an output; a monitor transducer connected to the output of said monitor amplifier; a source of signal connected with the input of said monitor amplifier; a variable impedance element operably associated with said monitor amplifier; a reactive element operably connected with said variable impedance element so that said variable impedance element serves as a tone control for said monitor amplifier; and means for coupling an external amplifier to said source of signal, said coupling means including means for connecting said variable impedance to operate as a volume control for said internal amplifier when an external amplifier is coupled to said source of signal.

5. In a record playing apparatus: an internal monitor amplifier having an input and an output; an internal monitor transducer connected to the output of said monitor amplifier; a source of signal connected with the input of said monitor amplifier; a variable impedance element operably associated with said monitor amplifier; a reactive element operably connected with said variable impedance element so that said impedance element serves as a tone control for said monitor amplifier; means, including a plug and jack, for coupling an external amplifier to said source of signal; and switch means connected with said impedance and reactance elements and associated with said plug and jack to be actuated by the insertion of the plug in the jack to connect said variable impedance element as a volume control for said monitor amplifier.

6. In a record playing apparatus: an internal monitor amplifier having an input and an output; an internal monitor transducer connected to the output of said monitor amplifier; a source of signal connected with the input of said monitor amplifier; an impedance element having a movable tap and operably associated with said monitor amplifier; a reactive element connected to said tap whereby said variable impedance element provides a tone control for said monitor amplifier; means for coupling an external amplifier to said apparatus including a plug with a conductive barrel portion and a jack with a spring contact and a ring, both adapted to engage the barrel of the plug when the plug is inserted in the jack; and connections between said reactive element, said spring contact and ring for shorting said reactive element through the barrel of said plug when the plug is inserted in the jack to couple an external amplifier, whereby said variable impedance element serves as a volume control for said internal amplifier.

No references cited.